Patented Jan. 4, 1927.

1,613,532

UNITED STATES PATENT OFFICE.

PAUL POETSCHKE, OF MILFORD, DELAWARE, ASSIGNOR TO THE L. D. CAULK COMPANY, OF MILFORD, DELAWARE, A CORPORATION OF DELAWARE.

DENTAL CEMENT AND PROCESS OF MAKING THE SAME.

No Drawing.    Application filed December 3, 1921.    Serial No. 519,766.

My invention relates to dental cements applicable to any portion of the tooth structure where a slow setting, mildly alkaline, germicidal cement is indicated, and the method for the production thereof.

Objects of my invention are to provide a dental cement having certain germicidal and therapeutic properties which, when "set" or hardened, will be less hard than the tooth structure to which it is applied, and the effect of which will not be irritating to the adjacent tissue, and other objects which will appear hereinafter.

I am aware that ordinary dental cements, such as zinc oxyphosphate cements, have been used, for example, for filling root canals and certain types of dental cavities, but the use of which has been almost completely abandoned chiefly because these are highly acid while in the plastic state, due to the presence of free phosphoric acid, and are hence extremely irritating to the surrounding dental tissue; or because they become entirely too hard after setting. Other cements, such as the zinc oxychloride cements have also been used; but these set too rapidly and do not have the required strength or texture. Moreover, neither the zinc oxyphosphate nor the zinc oxychloride cements have the necessary germicidal properties.

As distinguished from the above, my new cement is a magnesium oxychloride cement, the use of which for the purpose indicated, either alone or in combination with a germicide or the like, is novel; it combines the advantages of opacity to the X-ray, slow hardening, being substantially free from volumetric change, mildly alkaline in reaction thus inhibiting the growth of the oral bacteria, and has a content of water-soluble and water-insoluble germicide; it may be adapted perfectly to the surface to which it is applied, to which it adheres tenaceously, and its germicidal action is exerted over a relatively large surrounding area.

I have found, for example, that a mixture of magnesium oxide and barium sulfate in the form of powder, when combined with a solution of magnesium chloride, will produce a mildly alkaline cement base which is opaque to the X-ray; and I have further ascertained by bacteriological experiment that a solution of potassium iodohydrargyrate added to the magnesium chloride liquid will provide an efficient soluble germicide. I have also found that mercurous chloride added to the powder, with or without the addition of di-thymol di-iodide would provide the insoluble germicide. The following are exemplary formulæ for preparing the powder and the liquid which, when combined in suitable manner, form my new dental cement:

Powder
| | Per cent. |
|---|---|
| Mercurous chloride | 5 |
| Di-thymol di-iodide | 2½ |
| Barium sulfate | 63½ |
| Magnesium oxide | 29 |

Liquid
| | Per cent by volume. |
|---|---|
| Magnesium chloride solution (1.230 sp. gr.) | 90 |
| Potassium iodohydrargyrate solution | 10 |

I may, if desired, add any suitable coloring matter to the cement in order to render it more easily visible, should it be necessary to remove it from the cavity of the tooth; and I may also add an aromatic substance thereto, for example, an essential oil, for the purpose of imparting an agreeable odor to the cement.

The potassium iodohydrargyrate solution is prepared by dissolving 50 grams of mercuric iodide and 40 grams of potassium iodide in 25 cubic centimeters of distilled water, and diluting the solution to 50 cubic centimeters.

The cement is prepared for use by combining the powder and liquid to a thin creamy consistency, by the well known spatulating process, for example, in the proportions of one gram of the powder and substantially one half cubic centimeter of the liquid; the result is a smooth, homogeneous, cementitious admixture, which is then ready for use, particularly for filling root canals, for which purpose it is specifically indicated, since it sets relatively slowly and after setting is less hard than the surrounding dentine. It is thus possible to examine the results of the operation by means of the X-ray; and if the root canal has not been filled to the apex thereof, the cement may easily be removed therefrom with a root canal drill without danger of perforating the adjacent harder dentine, since the drill tends to follow the path of the softer cement. The root canal may then be enlarged, if this be necessary, and re-filled until a satisfactory result is achieved. By reason of the opacity of the cement to the X-ray, the exact position thereof in the root canal may easily be determined. After setting, there is absolutely no contraction of my cement, the only volumetric change taking place being a very slight degree of expansion which, particularly in root filling operations, is highly advantageous.

The cement thus introduced into the canal is mildly alkaline and antiseptic while in the plastic state, exerts a permanent germicidal action after hardening, and causes no irritation of the surrounding tissue.

It is to be understood that my invention is not limited to the particular substances, methods and proportions and applications previously described. While I have specifically set forth certain germicides in both the powder and the liquid, which are capable of retaining their germicidal activity so as to sterilize tooth structure and periapical tissue when combined or otherwise associated with oxychloride cement and which will not interfere with the setting or other physical properties of the cement, it will be understood that I may use other equivalents thereto or a combination thereof; I may also use compounds other than barium sulfate, such as salts of bismuth, lead or the like, for rendering the cementitious substance opaque to the X-ray, the barium sulfate, however, being preferable by reason of its absolute insolubility. Although intended chiefly for filling root canals, my new cement may also be advantageously used for filling or lining other dental cavities, for example, those in deciduous teeth, where complete removal of the carious matter is often impossible and where a permanent germicidal agent is indicated; and my cement may also be used for setting crowns, bridges, inlays or the like, with equally good results.

Having thus described my invention, what I claim is:

1. A dental filling material comprising a magnesium oxychloride cement and a water-soluble germicide.

2. A dental filling material comprising a magnesium oxychloride cement and a water-insoluble germicide.

3. A dental filling material comprising a magnesium oxychloride cement and a combination of water-soluble and water-insoluble germicides.

4. An alkaline dental filling material comprising a magnesium oxychloride compound and soluble and insoluble germicides.

5. An alkaline dental filling material comprising a magnesium oxychloride compound and a germicide.

6. A dental filling material containing a cementitious magnesium oxychloride and a water-insoluble germicidal compound of mercury.

7. A dental preparation comprising a mixture of a powder containing magnesium oxide and a water-insoluble salt of mercury, and a magnesium chloride solution having a water-soluble compound of iodine dissolved therein.

8. An alkaline dental filling material comprising magnesium oxychloride and a water-soluble germicidal compound of iodine.

9. A dental cement comprising a magnesium oxychloride compound, an X-ray opaque substance, and potassium iodohydrargyrate.

10. An alkaline dental cement comprising a magnesium oxychloride compound, an X-ray opaque substance, potassium iodohydrargyrate and an active insoluble germicide.

11. A dental cement comprising a magnesium oxychloride compound, an X-ray opaque substance, potassium iodohydrargyrate and mercurous chloride.

12. A dental cement comprising a magnesium oxychloride compound, an X-ray opaque substance, potassium iodohydrargyrate, mercurous chloride and di-thymol di-iodide.

13. A dental cement comprising a magnesium oxychloride compound, barium sulfate, potassium iodohydrargyrate, mercurous chloride and di-thymol di-iodide.

14. A dental cement comprising mercurous chloride 5%, di-thymol di-iodide 2½%, barium sulfate 63½%, magnesium oxide 29%, magnesium chloride solution (1.230 sp. gr.) 90% by volume and potassium iodohydrargyrate solution 10% by volume.

15. The process of preparing a dental cement which consists in admixing a powder containing a magnesium oxide and an active insoluble germicide with a liquid containing a magnesium chloride solution and an active soluble germicide.

16. The process of preparing a dental cement which consists in admixing a powder containing a magnesium oxide and an insoluble germicide with a liquid containing a magnesium chloride solution and a soluble germicide.

17. The process of preparing a dental cement which consists in admixing a powder containing a magnesium oxide and an insoluble germicidal compound of mercury with a liquid containing a magnesium chloride solution and an active soluble germicide.

18. The process of preparing a dental cement which consists in admixing a powder containing a magnesium oxide and an insoluble germicide with a liquid containing a magnesium chloride solution and a soluble germicidal compound of iodine.

19. The process of preparing a dental cement which consists in admixing a powder comprising a magnesium oxide and an insoluble germicidal compound of mercury with a liquid comprising a magnesium chloride solution and a scluble germicidal compound of iodine.

20. The process of preparing a dental cement which consists in the admixture by spatulation of a powder comprising magnesium oxide, barium sulfate, mercurous chloride and di-thymol di-iodide with a liquid comprising a magnesium chloride and potassium iodohydrargyrate.

In testimony whereof I have hereunto set my hand.

PAUL POETSCHKE.